United States Patent [19]

Pareja

[11] 4,185,938
[45] Jan. 29, 1980

[54] LOCKING COLLAR FOR POWER TAKE-OFF MOUNTED SHAFTS

[75] Inventor: Ramon Pareja, Edina, Minn.

[73] Assignee: Lear Siegler, Inc., Santa Monica, Calif.

[21] Appl. No.: 961,993

[22] Filed: Nov. 20, 1978

[51] Int. Cl.² .............................................. B25G 3/28
[52] U.S. Cl. .................................... 403/359; 403/362
[58] Field of Search ............... 403/359, 362, 376, 377, 403/378

[56] References Cited

U.S. PATENT DOCUMENTS

| | | | |
|---|---|---|---|
| 2,102,375 | 12/1937 | Morton | 403/362 X |
| 2,136,819 | 11/1938 | Large | 403/362 X |
| 2,504,501 | 4/1950 | Conn | 403/362 X |
| 3,010,333 | 11/1961 | Rampe | 403/362 X |
| 3,463,520 | 8/1969 | Turro | 403/362 |
| 3,507,508 | 4/1970 | Andrews | 403/362 X |

*Primary Examiner*—Wayne L. Shedd
*Attorney, Agent, or Firm*—Haugen, Orrin M.; Thomas J. Nikolai

[57] ABSTRACT

A locking collar for releasably coupling together splined shafts and wherein the mating splined shafts include telescoping inner shaft and outer housing portions. The locking means includes a locking collar with a pair of radially spaced bores extending through the wall of the locking collar, with the bores being threaded. The housing portion of the splined shaft is provided with a threaded bore which extends in continuation with at least one of those in the locking collar. The inner diameter of the locking collar exceeds the outer diameter of the housing portion of the splined shaft by about one-and-a-half times the pitch of the threads of the bore formed in the housing portion. The arrangement is such that when a set screw is disposed within the bores having the common axis, and with the set screw making contact with the surface of the shaft portion of the splined shaft, the force of a second screw disposed in the second collar bore making contact with the outer surface of the housing sets up a resultant stress in the collar which displaces the axis of the collar bore from that of the housing bore, and further cams the first set screw tightly against the outer surface of the splined shaft.

4 Claims, 4 Drawing Figures

LOCKING COLLAR FOR POWER TAKE-OFF MOUNTED SHAFTS

BACKGROUND OF THE INVENTION

The present invention relates generally to an improved locking collar for splined shafts, and more specifically to a locking collar for a power take-off mounted shaft such as is commonly found in agricultural tractors and the like. The locking collar of the present invention has particular application for use in agricultural pumps, such as centrifugal or positive displacement pumps which are widely used in the agricultural industry.

Typically, agricultural tractors are provided with power take-off shafts for assisting the operator in a wide variety of applications. One common application is the use of the power take-off shaft for a drive for a pump, either a centrifugal type pump or a positive displacement pump, each of which are widely used. Inasmuch as transverse bores in power take-off shafts are not utilized, means must be found for providing locking engagement between the mating shaft segments without using a through-bolt member or the like. The present arrangement provides for releasably coupling together splined shafts wherein a simple locking collar is employed, and wherein no radially extending elements are provided extending outwardly from the outer surface of the locking collar.

SUMMARY OF THE INVENTION

Briefly, in accordance with the present invention, a locking collar is provided for use in combination with the splined shaft segments, with the locking collar having an inner diameter which is slightly greater than the outer diameter of the housing portion of the splined shaft. Furthermore, the locking collar is provided with a pair of radially spaced threaded bores, with the housing portion of the splined shaft further including a threaded bore which extends in continuation with one of the bores formed in the locking collar. Set screws are provided for the bores, with one of the set screws being adapted for threaded engagement with one of the bores formed in the locking collar, and for extension through the bore formed in the housing portion of the splined shaft so as to make contact with the outer surface of the inner shaft portion of the splined shaft. A second set screw is provided for positioning within the second bore formed in the locking collar, and arranged to make contact with the outer surface of the housing portion of the splined shaft, with a sufficient amount of force being applied between the locking collar and the housing portion so as to cause the locking collar to stress into an elliptical form, thereby displacing the axis of the common bores of the locking collar and housing portion, and thus resulting in a camming action of the set screw against the surface of the shaft portion of the splined shaft. The arrangement is particularly desirable for high speed power take-off units, and the arrangement contributes very little, if any, imbalance to the system, and provides for firm locking engagement between the two portions of the mating splined shaft.

Therefore, it is a primary object of the present invention to provide an improved locking means for releasably coupling together mating splined shafts, with the coupling being achieved by a locking collar which is adapted to receive a pair of set screws, with the set screws establishing a stress within the locking collar and a resulting firm coupling between the mating sections of the splined shaft.

It is yet a further object of the present invention to provide an improved highly reliable releasable coupling arrangement for mating splined shafts, wherein the coupling arrangement includes a locking collar having a pair of radially spaced bores formed therethrough, and wherein a first set screw is adapted to extend through the locking collar and through the housing portion of the splined shaft, and wherein a second angularly displaced bore in the locking collar is utilized to receive a set screw to establish a stressed condition within the locking collar for achieving a firm mating engagement between the sections of the splined shaft.

Other and further objects of the present invention will become apparent to those skilled in the art upon a study of the following specification, appended claims, and accompanying drawings.

IN THE DRAWINGS

FIG. 1 is a side elevational view of a conventional agricultural tractor having a power take-off shaft extending therefrom, and upon which is mounted a centrifugal pump having a splined hollow shaft or housing portion adapted to engage the power take-off shaft of the tractor, with the splined shafts being, in turn, releasably coupled together with the locking collar arrangement of the present invention;

DESCRIPTION OF THE PREFERRED EMBODIMENT

Figure 1:
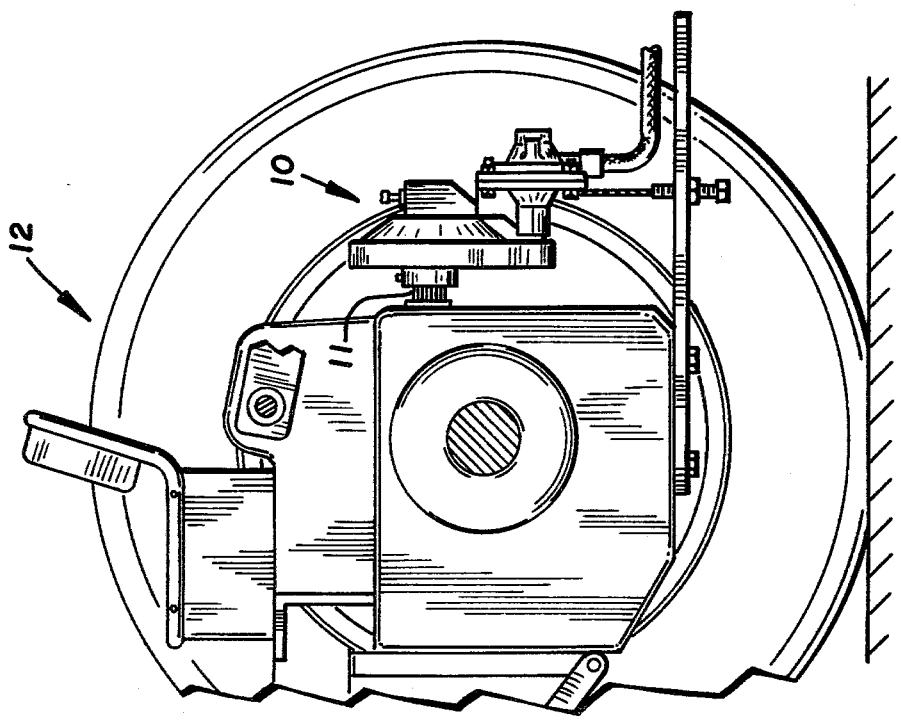

In accordance with the preferred embodiment of the present invention, and with particular attention drawn to FIG. 1 of the drawings, the pump assembly generally designated 10 is mounted upon the power take-off shaft 11 of the agricultural tractor generally designated 12. Specifically, the centrifugal pump 10 may be of any conventional design, with one suitable design being disclosed in U.S. Pat. No. 3,863,517 dated Feb. 4, 1975 and assigned to the same assignee as the present invention. It will be appreciated, of course, that other pumps as well as other devices, that is, devices other than pumps, may be adapted for use with the locking collar arrangement of the present invention. In fact, virtually any implement driven with a rotating shaft may find application for the locking collar of the present invention. In the arrangement illustrated in FIG. 1, however, the centrifugal pump and the drive unit therefor are modified slightly from that shown in U.S. Pat. No. 3,863,517, with the modifications being directed to the detail of the releasable coupling means.

Figure 2:
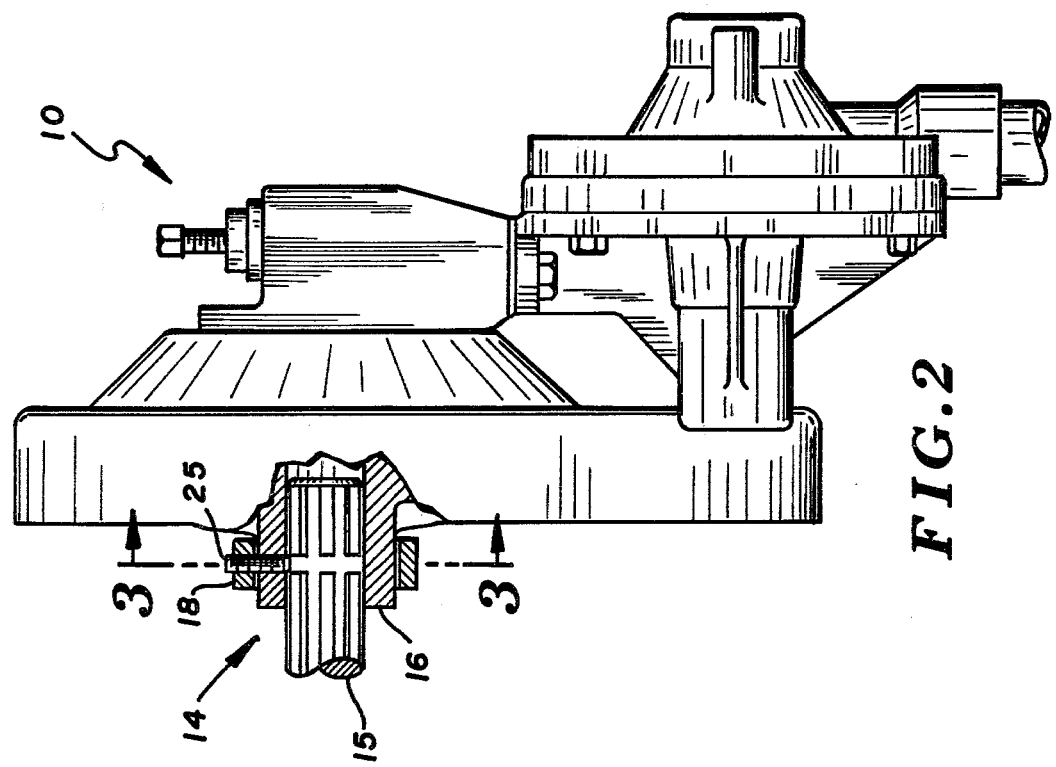
FIG. 2 is a side elevational view, partly in section, and illustrating the detail of the engagement between the splined power take-off shaft and the splined housing portion of a typical centrifugal driven pump.

With attention now being directed to FIG. 2 of the drawings, the mating splined shaft, shown generally at 14, include a telescoping inner shaft portion 15, together with an outer housing portion 16. The splined portion shown in this embodiment utilize parallel side splines, although it will be appreciated that involute splines may be coupled together with the locking collar means of the present invention as well.

Figure 3:
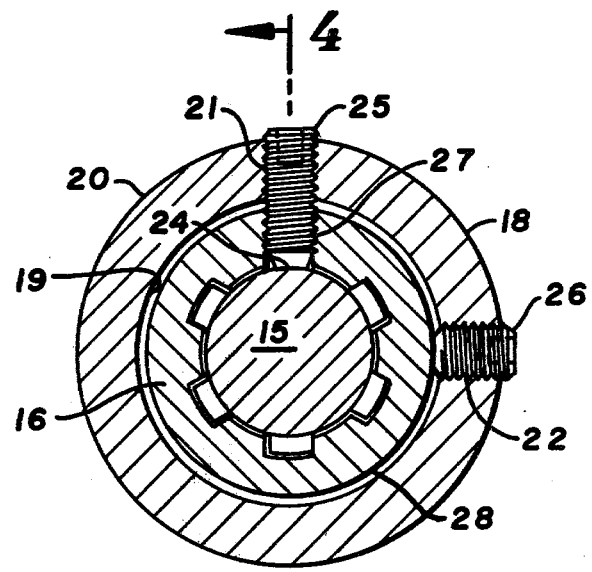
FIG. 3 is a vertical sectional view taken along the line and in the direction of the arrows 3—3 of FIG. 2, with FIG. 3 being shown on a slightly enlarged scale.

Attention is now directed to FIG. 3 of the drawings wherein the details of the locking collar 18 are illustrated. Specifically, locking collar 18 is formed having an inner diametrical surface as at 19, and an outer surface as at 20. The wall thickness of the collar is threadably bored at two angularly disposed locations, with one such bore being formed at 21, and a second at 22. While it is generally preferred that the bores 21 and 22 are spaced apart 90°, it will be appreciated that any angular displacement less than 180° would be workable. The best action is, of course, achieved at 90° displacement. It will be further noted that the splined inner shaft 15 is provided with an annular relief zone as at 24, with this annular relief zone being commonly found in power take-off splined shafts.

A pair of set screws are provided for the threaded bores 21 and 22, with these set screws being shown at 25 and 26. Preferably, set screws 25 and 26 are of the hexagonal socket type, with such set screws being, of course, commercially available.

The side wall of housing portion 16 is bored and is tapped with the same thread as used in bore 21. Therefore, when aligned, bores 27 and 21 are coaxial.

Figure 4:
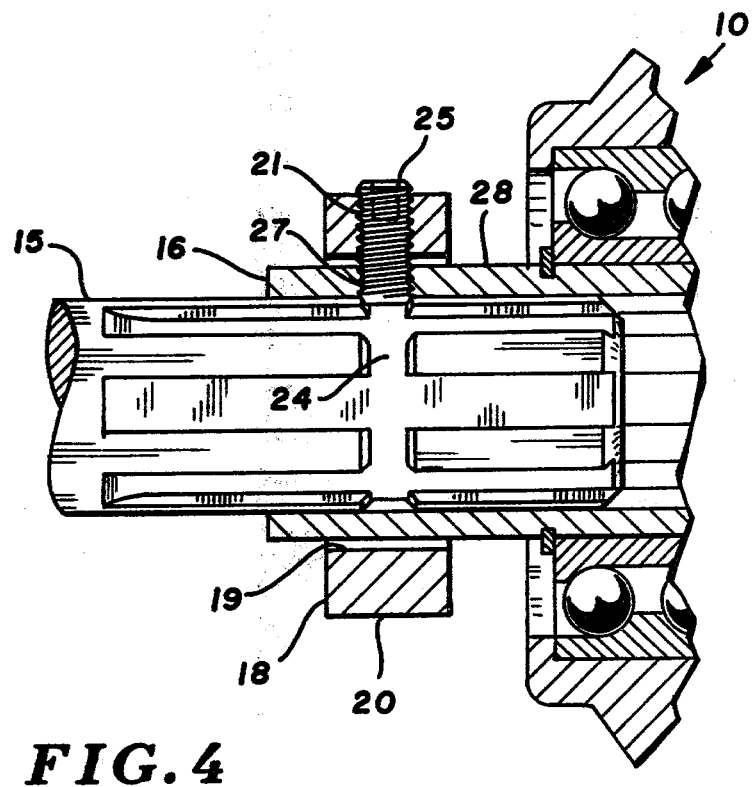
FIG. 4 is a vertical sectional view taken along the line and in the direction of the arrows 4—4 of FIG. 3, with FIG. 4 being drawn to the same enlarged scale as FIG. 3.

It will be noted that there is a diametral clearance between the inner annular surface 19 of collar 18 and the outer surface 28 of housing portion 16. The diametral clearance is preferably about one-and-a-half times the thread pitch of the threads formed in the bores 21 and 27, with this diametral clearance being for a purpose which will be more fully explained hereinafter. In assembling the arrangement so as to releasably couple the splined shafts together, the housing portion 16 (which becomes the driven shaft) is mounted upon the inner shaft until the relieved portion 24 is generally axially adjacent the bore of housing portion 16, as illustrated in FIG. 4. Then, with locking collar 18 in place, set screw 25 is advanced through the wall of collar 18, the wall of housing portion 16, and into firm contact with the outer surface of inner shaft (PTO shaft) 15. Thereafter, set screw 26 is advanced through bore 22 until it makes locking and firm contact with the outer surface of housing portion 16. Sufficient force is applied between the set screw 26 and housing portion 16 so as to establish a stress within collar 18, thereby causing collar 18 to assume a somewhat elliptical configuration. This arrangement provides for the set screw 21 to make contact with the surface of shaft portion 16, and the slight axial misalignment of the bores 21 and 27 firmly engage and lock set screw 25 into the arrangement. Furthermore, with set screw 25 is advanced into contact with the annular relieved portion 24 of PTO shaft 15, a "camming" action occurs upon the slight axial misalignment of bores 21 and 27, with this "camming" action causing a modest axial rotation to occur between housing portion 16 and shaft portion 15. Therefore, when this camming action occurs, the surfaces of the individual splines are held in firm engagement, one against the other, thereby avoiding and limiting any relative axial motion between the mating splined shaft portions.

By way of materials of construction, steel is a desirable material to be utilized, it being understood, however, that aluminum alloys may be employed as well. In this connection, spring steel is perhaps the preferred material.

In order to readily fabricate the individual locking collar, it may be desirable to initially form a locking collar having an inner diameter which generally matches that of the outer diameter of the housing portion. Then, the two elements may be bored together, with the inner diameter of the locking collar being thereafter expanded by removal of a portion of the inner wall surface. Again, the difference in diameters should preferably be about one and one-half times the pitch of the threads, although somewhat greater or less differences may be accommodated. It will be appreciated, however, that there is preferably a diametral clearance or mismatch between the inner diameter of the locking collar and the outer diameter of the housing portion.

I claim:

1. Means for releasably coupling together spline shafts and wherein the mating splined shafts include telescoping inner shaft and outer housing portions respectively and wherein said outer housing portion has a certain predetermined outer diameter, and with said outer housing portion having a radially directed threaded bore extending therethrough, said coupling means comprising:
   (a) a locking collar having first and second radially extending threaded bores formed therethrough, and with the pitch of the threads of said first bore having a predetermined value, and matching that of the bore within said housing portion, and with the inner diameter of said collar being greater than the outer diameter of said housing portion by an amount greater than said predetermined pitch value, and wherein said radial bores are angularly disposed at an angle of less than 180°;
   (b) first set screw means within said first bore and having a length sufficient to pass through and occupy said first collar bore and said housing portion bore;
   (c) second set screw means within said second collar bore and adapted to be lockingly engaged against the outer diameter of said housing portion so as to cause said locking collar to become stressed;
   (d) the arrangement being such that when said first set screw is disposed within said first bore and housing portion and making contact with the surface of said shaft portion, the force of said second set screw against said locking collar cams said first set screw against the surface of said shaft portion and the resultant stress in said collar displaces the axis of said first bore and housing portion bore respectively.

2. The coupling means as defined in claim 1 being particularly characterized in that said collar bores are displaced approximately 90°, one from the other.

3. The coupling means as defined in claim 1 being particularly characterized in that the inner diameter of said collar exceeds the outer diameter of said housing portion by approximately one and a half times said pitch of the threads of said first bore.

4. The coupling means as defined in claim 1 being particularly characterized in that the axial length of said first set screw is approximately equal to the combined wall thickness of said housing portion and said locking collar.

* * * * *